Oct. 12, 1965  E. C. GARTHE  3,211,206
ADAPTER FOR USE WITH TIRE-CHANGING EQUIPMENT
Filed Nov. 10, 1964  2 Sheets-Sheet 1

INVENTOR
EDMUND C. GARTHE

BY  W. E. Sherwood

ATTORNEY

Oct. 12, 1965     E. C. GARTHE     3,211,206

ADAPTER FOR USE WITH TIRE-CHANGING EQUIPMENT

Filed Nov. 10, 1964     2 Sheets-Sheet 2

INVENTOR
EDMUND C. GARTHE

BY W. E. Sherwood

ATTORNEY

United States Patent Office 3,211,206
Patented Oct. 12, 1965

3,211,206
ADAPTER FOR USE WITH TIRE-CHANGING
EQUIPMENT
Edmund Conrad Garthe, Frankfort, Ky.
(4611 E. Calle Ventura, Phoenix, Ariz.)
Substituted for abandoned application Ser. No. 171,611,
Feb. 7, 1962. This application Nov. 10, 1964, Ser. No.
410,252
4 Claims. (Cl. 157—1.24)

This application is a substitute for an earlier application, Serial No. 171,611 filed Feb. 7, 1962, and now abandoned.

The invention relates to equipment for the changing of tires on wheels, and more especially to an improved form of adapter permitting a standard type of tire changing equipment to be employed with wheels having large hub openings therein.

Certain automobiles of foreign manufacture, notably the Volkswagen, employ wheels in which the hub openings are substantially larger and of configurations different from those found on cars of domestic manufacture. As a result the clamping means of conventional tire changing equipment is unable to engage such a wheel for use in the tire changing operation for which the equipment is intended. Moreover, when the wheel employs projecting clips for holding the wheel cover in place, such clips are vulnerable to breakage during the tire changing operation as well as presenting a safety hazard to the operator conducting that operation.

It is an object of my invention to overcome these and other disadvantages by providing an improved adapter which when used in combination with a standard type of tire changing equipment will increase the capabilities of such equipment to handle a greater variety of wheels and without requiring modification of the equipment.

Another object is to provide an adapter which protects the wheel cover clips and which reduces the likelihood of injury to the operator.

Another object is to provide an inexpensive and simple adapter which may be easily installed and which during use does not mar the surfaces of the wheel.

Other objects and advantages will become more apparent as the description proceeds and when considered in conjunction with the accompanying drawings in which FIG. 1 is a perspective view of a typical tire changing equipment with which the adapter may be employed.

Figure 1:
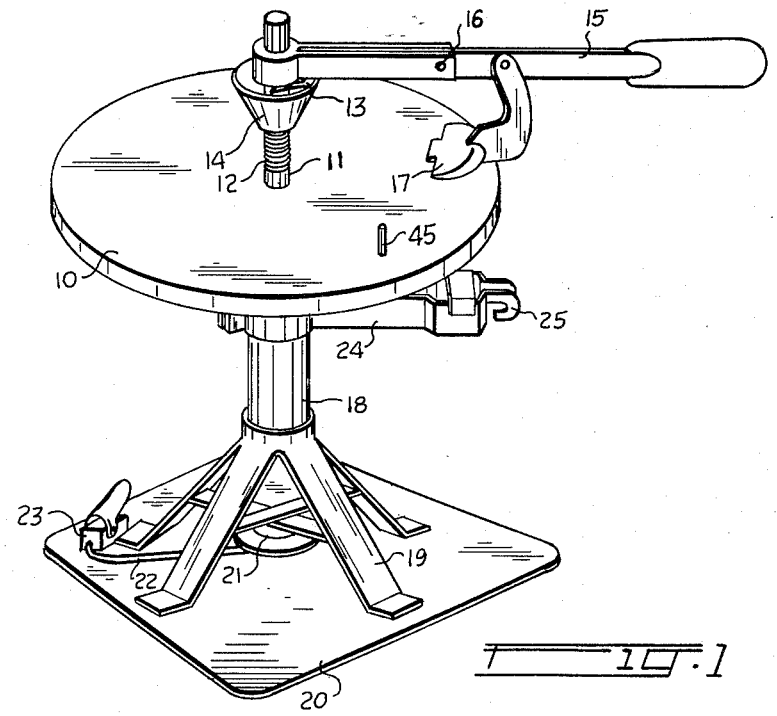

Referring first to FIG. 1, a standard type of tire changing equipment customarily employed with wheels having circular hub openings and with relatively small diameters of such openings includes a flat table top 10 on which the wheel is deposited and with a vertically movable shaft 11 extending through the table and arranged to be located within the hub opening of the wheel. This shaft is provided with annular grooves 12 into which a fastening means 13 of a hollow inverted conical clamp 14 may be selectively engaged so that the clamp will partake of the shaft movement. As will be understood, the clamp is detachable from the shaft and is placed in operative position after the wheel is in place and is removed from the shaft before the wheel is removed from the table. Likewise, the shaft provides a fulcrum about which a conventional jack-knife type of lever 15 pivoted on a laterally projecting pin 16 may be moved circumferentially about the table top in order to bring its hinged presser plate 17 to bear upon the upper surface of a tire at a selected point. A cylindrical post 18 is joined to the bottom of the table and is supported as by legs 19 upon a floor or a base plate 20. By means of a piston or diaphragm 21 attached to the lower end of the shaft 11 which is enclosed in the post 18, a pressure fluid or vacuum supplied by conduit 22 under control of valve 23 may be applied to draw the shaft 11 and its attached clamp 14 downwardly. A laterally projecting bracket 24 is rotatably mounted on post 18 below the table and provides a hook means 25 for receiving the pin 16 of the lever so that when disengaged from the shaft 11 and after being inverted and with the pin 16 fulcrumed in the hook means 25, the lever 15 may optionally be employed to contact the lower side of a tire and to enable the plate 17 to force the tire upwardly from the wheel.

Having thus described one form of standard tire changing equipment with which my adapter may be used it will, of course, be apparent that other forms of such equipment likewise may be used without departing from my invention.

Figure 2:
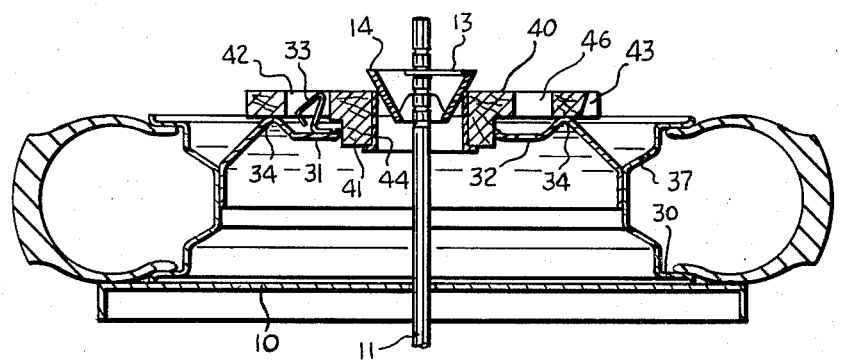
FIG. 2 is a diametrical cross section of the adapter, wheel, and tire in place on the equipment preparatory to a tire changing operation.
Figure 3:
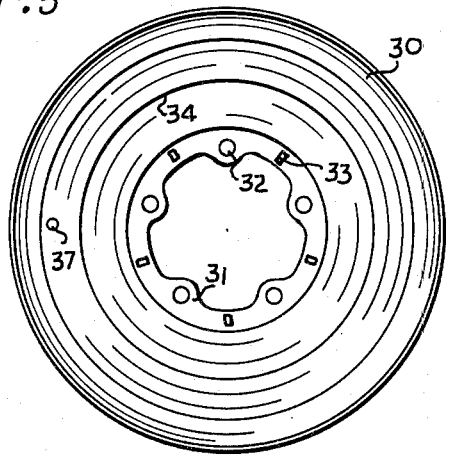
FIG. 3 is a top plan view of a wheel of the Volkswagen type with the tire removed.

Considering now a type of wheel which the described equipment is presently unable to handle, the standard Volkswagen wheel, shown in FIGS. 2 and 3, includes a metallic rim 30 having rigidly attached thereto a metallic face plate with a generally planar inner ledge 31. The hub opening in this plate is a scalloped configuration and has a diameter larger than the maximum diameter of the clamp 14 above described. Extending through the ledge 31 are a plurality of bolt-receiving holes 32 for use in joining the wheel to the customary wheel drum of the car, and projecting outwardly from and attached to the face plate ledge are a plurality of wheel cover securing clips 33. The face plate intermediate the ledge 31 and the junction with rim 30 includes an outwardly directed ridge 34 on which the lower surfaces 35 and 36 of the later to be described adapters rest, and the thickness of such adapters is such that the clips 33 are enclosed within the adapter, as best shown in FIG. 2, thus to permit the presser plate 17 of the equipment to be swung into position without touching the clips. The rim of the wheel is also provided with the usual hole 37 for the tire stem.

Figure 4:
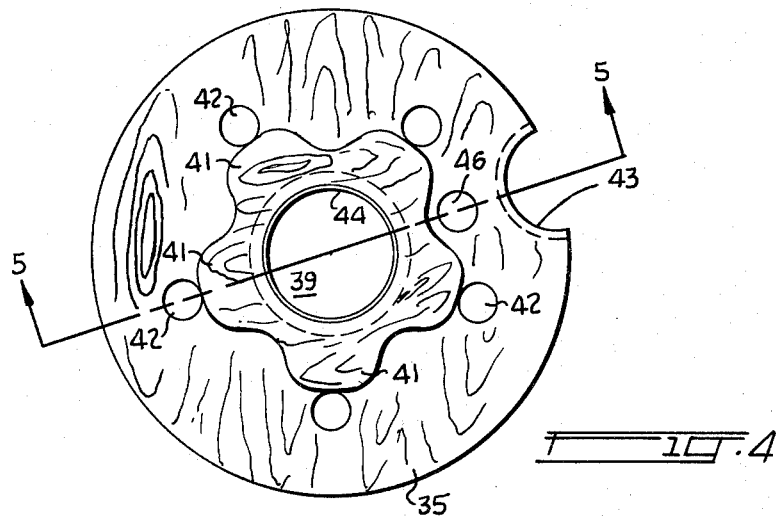
FIG. 4 is a bottom plan view of one form of adapter embodying the invention.
Figure 5:
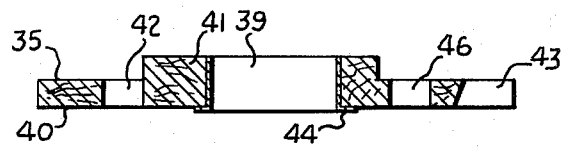
FIG. 5 is a cross section view on line 5—5 of FIG. 4.

Referring now to FIGS. 4 and 5, one form of such adapter comprises a non-metallic member with a central circular aperture 39 and having a flat upper surface 40 parallel to the lower surface 35 and with a centrally disposed guide portion projecting beyond that lower surface. This guide portion is preferably formed with lobes 41 of a size, number and configuration which correspond to the scalloped portion of the wheel hub opening. Circumferentially spaced around the member outboard of the lobes and at location corresponding to the spacings of the clips 33 on the wheel are a plurality of holes 42. The member is cut away at one section of its periphery as shown at 43 and corresponding to the location of the tire stem hole 37 in the wheel rim. When material such as plastic, plywood or the like is used for forming the adapter in order to avoid marring the surface of the wheel at the contact between ridge 34 and the adapter, it is desirable to reinforce that part of the adapter which contacts clamp 14, and a metallic ferrule 44 accordingly is provided as shown in FIGS. 4 and 5. Moreover, certain types of tire changing equipment tables are furnished with a pin 45 for engagement in one of the bolt receiving holes of the wheel and I therefore provide in the adapter a supplementary hole 46 into which such a pin can project, if desired.

As will now be apparent, when it is necessary to change a tire on a wheel of the illustrated type, the wheel and attached tire are first placed on table 10 as seen in FIG. 2 and the adapter is arranged in place above the wheel face plate with its lobes engaging within the scallops of the hub opening and with all of the cover clips disposed in the holes 42. The clamp 14 is then adjusted on the shaft 11 and its fastening means is engaged within a groove 12 after which the shaft 11 is lowered to form the rigid assembly seen in FIG. 2. The diameter of the aperture 39 is less than the maximum diameter of the clamp and thus the clamp engages the adapter which in turn is engaging the wheel within its much larger hub opening. The lever 15 may be manipulated either above or below the table without interference with the adapter and since the adapter rests with a line contact upon ridge 34 and is of a non-metallic material, no marring of the surface of the wheel will occur. After completing the tire change, the shaft is raised, the clamp and then the adapter are removed, and the tire changing equipment is then ready for subsequent use.

Figure 6:
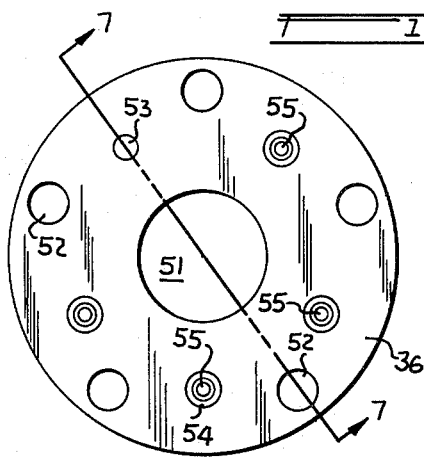
FIG. 6 is a bottom plan view of a second form of adapter.
Figure 7:
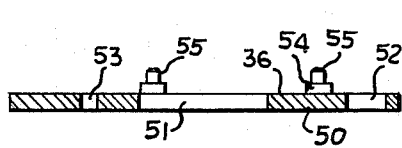
FIG. 7 is a cross section view on line 7—7 of FIG. 6.

Other forms of adapters may also be employed and as shown in FIGS. 6 and 7 one such alternate form may comprise a thin, flat metallic plate with a lower surface 36 and an upper surface 50. A circular central aperture 51 having a diameter suitable for engagement by clamp 14 is formed in the adapter along with circumferentially spaced holes 52 for receiving the wheel cover clips and a supplementary hole 53 for receiving the pin 45 of the table top. For the purpose of saving weight the adapter is provided on its under surface with a plurality of bosses 54 from which guide pins 55 project. These pins are adapted to fit into the bolt-receiving holes 32 of the wheel and the bosses are adapted to raise the thin plate to such a level that the upper surface 50 of the plate is not lower than the upper ends of the clips which are contained in the holes 52.

As will be seen in both modifications the guide means for engaging the adapter with the wheel is symmetrically located with respect to the central aperture in the adapter and the holes for receiving and protecting the clips lie outboard of that guide means.

Manifestly the invention as illustrated and described, is susceptible of modification without departing from the inventive concept and it is intended to cover all such modifications as fall within the scope of the appended claims.

What I claim as new and desire to secure by Letters Patent of the United States is:

1. Tire changing equipment comprising in combination, a table having a surface for supporting a wheel thereon, a clamping shaft extending upwardly from said table and a generally conically shaped clamp detachably engaged with said shaft and adapted to clamp on said table, a wheel including a large hub opening, a plurality of outwardly projecting wheel-cover-securing clips, and a plurality of bolt-receiving holes; and an adapter for jointly engaging said wheel and said clamp during a tire changing operation, said adapter having means on its under side contacting said wheel for preventing shifting of the same with respect to said adapter and having a plurality of holes therein for receiving the respective clips, said adapter having a centrally located clamp-receiving circular aperture of substantially smaller size than the hub opening in said wheel and a diameter less than the maximum diameter of said conical clamp thereby to permit said clamp to extend into the adapter aperture.

2. Apparatus as defined in claim 1 wherein said means for preventing shifting comprises a depending guide portion rigidly attached to the under side of said adapter and engageable within a substantial portion of the periphery of the hub opening of said wheel face plate.

3. Apparatus as defined in claim 1 wherein said means for preventing shifting comprises a plurality of pins rigidly attached to the under side of said adapter and engageable in said bolt-receiving holes in said wheel.

4. A tire-changing adapter of the type described comprising, a member having a generally flat upper surface, a centrally located circular aperture therethrough, means rigidly fixed to said member on the lower side thereof for engaging a wheel with which said adapter is to be employed, said means being symmetrically located on said member and extending diametrically of said member for a distance substantially greater than the diameter of said aperture, and a plurality of circumferentially spaced holes through said member outboard of said means for receiving and protecting clips projecting from the wheel with which said adapter is being employed.

No references cited.

GRANVILLE Y. CUSTER, Jr., *Primary Examiner.*